R. WHITE.

Cartridge.

No. 3,833. Reissued Feb. 8, 1870.

Witnesses
J. Columbs
M. M. Livingston

Inventor
R. White
by Munn & Co
attys

UNITED STATES PATENT OFFICE.

ROLLIN WHITE, OF LOWELL, MASSACHUSETTS.

IMPROVEMENT IN METALLIC CARTRIDGES.

Specification forming part of Letters Patent No. 33,805, dated November 26, 1861; Reissue No. 3,833, dated February 8, 1870.

*To all whom it may concern:*

Be it known that I, ROLLIN WHITE, formerly of Davenport, Scott county, Iowa, but now of Lowell, in the county of Middlesex and State of Massachusetts, have invented certain new and useful Improvements in Cartridges; and I do hereby declare that the following is a full, clear, and exact description of the same, reference being had to the accompanying drawings, forming part of this specification, in which—

Figure 1:
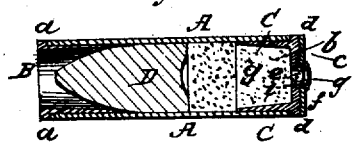
Figure 3:
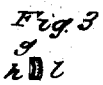
Figure 2:
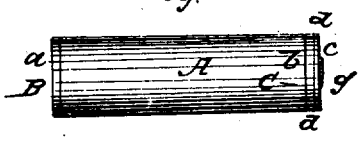

Figure 1 is a central longitudinal section of a cartridge constructed according to my invention. Fig. 2 is a longitudinal outside view of the same, and Fig. 3 is a central section of the percussion cap or pellet detached from the cartridge.

Similar letters of reference indicate corresponding parts in the several figures.

This invention is applicable to revolvers and other breech-loading fire-arms having the chamber or chambers bored clear through to the breech, and especially to those in which a joint is formed between the chambers and the barrel or portion of the barrel in front of the chamber, for the introduction of cartridges at the breech.

It consists, first, in the construction of the case of the cartridge of two or more pieces of metal, movable longitudinally in relation to each other, so that when the charge is fired one portion may be driven by the force of the explosion forward against the barrel or fixed portion thereof, and the other portion backward against the breech, to prevent the escape of gas; and, second, in re-enforcing the rear end of the cartridge-case by means of a supplemental tube or cup, of the construction hereinafter more particularly described, so that it will more effectually withstand the explosion of the charge; and it further consists in a certain construction of the cap or pellet sustaining the percussion-priming, and fitting the same to a metallic cartridge-case, whereby it is made to act as a valve to close the vent of the said case by the force of the blow of the hammer and of the explosion of the charge, and whereby it is supported in such a manner against the blow of the hammer as to insure its explosion.

To enable others to construct cartridges according to my invention, I will proceed to describe it with reference to the drawings.

The case of the cartridge represented is made of three separate pieces, A, B, and C. The principal piece, A, is a light cylindrical tube, of brass or copper, of a length about equal to the movable chamber or chambers of the firm-arm in which it is to be used, and of a caliber slightly larger than that of the fixed barrel of the arm, the movable chamber or chambers of which should be of a caliber so much larger than the barrel as to permit the said tube to be inserted easily within it, the whole of the case being intended to remain in the chamber after the discharge.

The pieces B and C are made of short pieces of thin tubing, having such external diameter as to enable them to fit snugly within the tube A, the said pieces being inserted into the tube A from opposite ends, the front piece B having at its front end an external collar, *a*, and the back piece C having firmly secured to it a base-piece, *b c d*, on which is formed a flange, *d*, the thickness of the collar *a* and flange *d* being such that they fit close up to the ends of A. The whole length of the case will be about equal to the length of the movable chamber or chambers of the arm.

The tubes B are short enough to enable the ball D to be received within the tube A, between the inner ends of the said tubes B and C; and the interior of the front tube B is very slightly larger than the bore of the barrel or stationary portion of the barrel, in order that the ball, after passing through the said tube B, may slug in the grooves of the barrel.

A vent, *e*, is made in the base-piece *b c*, and this vent is so countersunk in the rear as to form a shoulder or anvil, *i*, and cavity *f*; and in order to facilitate the construction of this cavity and add to the strength of the base-plate, it may be made of two pieces of sheet metal, *b c*, soldered together, the vent *e* being made in the inner piece *b*, and the larger cavity in the rear piece *c*.

The cap or pellet is made like that known as "Sharp's priming," as represented, or of other construction in which the priming is inclosed between two pieces of metal, and these two pieces, *h l*, Fig. 3, are made of concave-convex form, to present a convex form toward the rear, and a concave form toward the front, and it is made with the beveled or sharp edge, as shown at *t*, Fig. 3, so that it will more effectually spread and close the vent when struck by the hammer, or its equivalent.

The explosion of the charge of powder *j* in the cartridge is effected by the hammer striking the pellet or cap *g* where it is supported by the shoulder *i*, and so causing the explosion of the priming, the fire from which is conveyed through the vent *e* to the charge *j*.

As the ball is driven forward through the tube B, in which it slugs, it drives the said tube forward against the rear end of the fixed barrel, or fixed portion of the barrel, and so causes the front end of the said tube to close the joint between the said barrel and the front of the chamber, and at the same time the pressure of the gas evolved by the explosion forces the tube or cup C back against the breech of the arm, and so causes the joint between the rear of the chamber and the breech to be closed tightly, while the pressure of the gas upon the pellet drives it back against the hammer, and spreads it against the edges of the vent after the manner of a valve, and thus make it close the vent effectually.

The same results may be obtained in two different ways, by making the cartridge-case of two pieces only, viz: first, by attaching the base of the cartridge permanently to the tube A, and so dispensing with the tube C, but using the tube B; and, secondly, by making the ball fit tightly enough in the tube A to carry it forward against the rear end of the fixed barrel or other fixed portion of the barrel, and so dispensing with the tube B, but using the tube C.

In either of the cases, one portion of the cartridge-case will be driven forward against the fixed barrel, or fixed portion of the barrel, and the other portion against the breech; or the tube or cup C may be used simply as a re-enforce to the rear end of the cartridge-case, with or without the tube B, in which case the base may consist of the two plates *b c*, as described, or of one plate of the requisite thickness.

That part of the said cup or tube C which enters the tube A is beveled on the inner side, from the rear to the front end, so as to have thickness and strength at the base, where strength is required, and come to a sharp edge, or nearly so, at the front end. This secures the requisite strength with the least weight of metal, and lessens the tendency of the gas to blow out between the cup C and the surrounding tube A.

The base of the re-enforcing tube or cup C, whether made of one piece of metal or two, is to be of sufficient thickness to form the cavity *g* therein, with a shoulder, *i*, around the vent, to serve as an anvil, and to have sufficient strength to withstand the force of the explosion and resist the blow of the hammer or plunger.

A cartridge-case with its base thus re-enforced may be recharged and used an indefinite number of times, a new cap or pellet being applied each time, and said re-enforce may consist of a supplemental cup or plate inserted in or attached to the base of the case A, or in an excess of metal at the base of the cartridge-case, to give it sufficient strength to withstand the force of the explosion.

What I claim as my invention, and desire to secure by Letters Patent, is—

1. A cartridge-case consisting of two or more metal tubes, movable longitudinally with reference to each other, substantially as and for the purpose specified.

2. A metallic cartridge-case with a re-enforcing cup to strengthen its base, the inner side of said cup being beveled from its rear to its front end, substantially as and for the purposes described.

3. The cavity *f* in the base of the cartridge-case, to receive a pellet or cap primed with fulminate, in combination with the shoulder or anvil *i* and vent *e*, substantially as described.

4. The cap or pellet *g*, so applied to the base of the cartridge that it will be caused to operate as a valve to close the vent thereof by the force of the blow of the hammer or plunger, or of the explosion of the charge.

5. The cap or pellet *g*, with a sharp or beveled edge, *t*, substantially as and for the purpose set forth.

6. A fixed anvil, which may be solid with or an attached portion of the cartridge-case, in combination with the cavity *f*, for the purpose of a firm bearing to support the cap or pellet against the blow of the hammer, or equivalent, for insuring the explosion or ignition of the priming.

ROLLIN WHITE.

Witnesses:
S. W. STICKNEY,
FRANK P. HAGGITT.